(12) United States Patent
Bari et al.

(10) Patent No.: US 9,215,591 B2
(45) Date of Patent: Dec. 15, 2015

(54) SECURITY FOR NETWORK LOAD BROADCASTS OVER CELLULAR NETWORKS

(71) Applicant: AT&T Intelletual Property I, L.P., Atlanta, GA (US)

(72) Inventors: Farooq Bari, Kirkland, WA (US); Zhi Cui, Sugur Hill, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/707,240

(22) Filed: Dec. 6, 2012

(65) Prior Publication Data

US 2014/0161256 A1 Jun. 12, 2014

(51) Int. Cl.
*H04W 48/18* (2009.01)
*H04W 48/10* (2009.01)
*H04W 12/06* (2009.01)
*H04W 36/16* (2009.01)
*H04W 72/00* (2009.01)
*H04W 72/02* (2009.01)
*H04W 12/02* (2009.01)
*H04W 12/04* (2009.01)

(52) U.S. Cl.
CPC .............. *H04W 12/06* (2013.01); *H04W 12/02* (2013.01); *H04W 48/10* (2013.01); *H04W 48/18* (2013.01); *H04W 12/04* (2013.01); *H04W 36/16* (2013.01); *H04W 72/005* (2013.01); *H04W 72/02* (2013.01)

(58) Field of Classification Search
CPC ..... H04W 12/06; H04W 12/02; H04W 12/04; H04W 63/08; H04W 9/08; H04W 48/18; H04W 48/10; H04W 36/04; H04W 36/16; H04W 36/165; H04W 36/18; H04W 36/22; H04W 72/02; H04W 72/005
USPC ........................................................ 380/247
See application file for complete search history.

(56) References Cited

U.S. PATENT DOCUMENTS

| | | | | |
|---|---|---|---|---|
| 6,137,885 | A * | 10/2000 | Totaro et al. ................... | 380/247 |
| 6,477,644 | B1 * | 11/2002 | Turunen ........................ | 713/161 |
| 6,745,326 | B1 * | 6/2004 | Wary ............................. | 713/168 |
| 7,940,932 | B2 * | 5/2011 | Paksoy et al. ................. | 380/247 |
| 8,064,598 | B2 * | 11/2011 | Vaha-Sipila et al. .......... | 380/247 |
| 8,190,146 | B2 * | 5/2012 | Beckmann et al. ........ | 455/426.2 |
| 8,824,410 | B2 * | 9/2014 | Kunz et al. .................... | 370/329 |
| 8,923,256 | B2 * | 12/2014 | Rinne et al. ................... | 370/338 |
| 2004/0221163 | A1 * | 11/2004 | Jorgensen et al. ............ | 713/182 |
| 2006/0115084 | A1 * | 6/2006 | Ryu .............................. | 380/247 |
| 2007/0121612 | A1 * | 5/2007 | Nadeau et al. ................ | 370/386 |
| 2007/0140488 | A1 * | 6/2007 | Dharmaji et al. ............. | 380/212 |

(Continued)

OTHER PUBLICATIONS

M. Fargano, T. Anderson, K. Sparks. "Network Optimization: Utilizing Standards to Maximize Existing Bandwith," *ATIS Webinar*, Sep. 2011, pp. 1-23.

(Continued)

*Primary Examiner* — Eleni Shiferaw
*Assistant Examiner* — Nelson Giddins (57) ABSTRACT

A method, computer readable medium and apparatus for obtaining cellular network load information in a secure manner are disclosed. For example, the method receives the cellular network load information, where the cellular network load information is encrypted. The method then decrypts the cellular network load information using a decryption key and performs a task responsive to the network load information that is decrypted.

10 Claims, 6 Drawing Sheets

(56) References Cited

U.S. PATENT DOCUMENTS

| | | | |
|---|---|---|---|
| 2007/0156807 A1* | 7/2007 | Ma et al. | 709/203 |
| 2007/0287422 A1* | 12/2007 | Fartmann et al. | 455/411 |
| 2008/0222696 A1* | 9/2008 | Nicodemus et al. | 726/1 |
| 2009/0052399 A1* | 2/2009 | Silver et al. | 370/331 |
| 2010/0177674 A1* | 7/2010 | Aggarwal | 370/312 |
| 2010/0192212 A1* | 7/2010 | Raleigh | 726/7 |
| 2011/0311047 A1* | 12/2011 | Issenmann et al. | 380/247 |
| 2012/0122422 A1* | 5/2012 | Olsson et al. | 455/410 |
| 2012/0324091 A9* | 12/2012 | Raleigh et al. | 709/224 |
| 2013/0080607 A1* | 3/2013 | Raleigh | 709/221 |
| 2013/0096998 A1* | 4/2013 | Raleigh | 705/14.4 |
| 2013/0308781 A1* | 11/2013 | Kristiansson et al. | 380/270 |
| 2013/0322238 A1* | 12/2013 | Sirotkin | 370/230 |
| 2013/0336111 A1* | 12/2013 | Vos et al. | 370/230 |
| 2014/0162626 A1* | 6/2014 | Cui et al. | 455/422.1 |
| 2014/0295791 A1* | 10/2014 | Cai et al. | 455/406 |

OTHER PUBLICATIONS

P. Chitrapu, A. Reznik, J. C. Zuniga. "Cellular Wi-Fi Integration—A Comprehensive Analysis—Part III," *InterDigital*, Aug. 2012, consists of 7 unnumbered pages.

P. Chitrapu, A. Reznik, J. C. Zuniga. "Cellular Wi-Fi Integration—A Comprehensive Analysis—Part II," InterDigital, Jul. 2012, pp. 1-4.

P. Chitrapu, A. Reznik, J. C. Zuniga. "Cellular Wi-Fi Integration—A Comprehensive Analysis," *InterDigital*, Jun. 2012, pp. 1-5.

D. Bubley. "Carrier WiFi Opportunities Enabling Offload, Onload, and Roaming" *Disruptive Analysis*, Aug. 2011, pp. 1-23.

P. Chitrapu, A. Reznik, J. C. Zuniga. "Cellular Wi-Fi Integration—A Comprehensive Analysis of the Technology and Standardization Roadmap," *InterDigital*, Jun. 2012, pp. 1-26.

\* cited by examiner

SECURITY FOR NETWORK LOAD BROADCASTS OVER CELLULAR NETWORKS

Embodiments of the present disclosure relate to intelligent network selection between cellular and Wi-Fi networks.

BACKGROUND

Many endpoint devices, such as cellular telephones or smart phones, support multiple connection types for communicating with other devices and networks. For example, a typical smart phone may be capable of communicating with one or more cellular network types (e.g., a Global System for Mobile Communication (GSM) network, a code division multiple access (CDMA) network, a 3rd generation (3G) network, a 4th generation (4G) network, and so forth). In addition, the smart phone may also be capable of communicating with a number of non-cellular network types, such as Wi-Fi networks, and the like. Thus, a user of the smart phone may desire to have a voice, text or video session with another device and may have a cellular network connection that is available. There may also be available one or more Wi-Fi networks for establishing a connection. However, at any given time and at any given location, it may not be apparent which type of connection is the most efficient method for the smart phone to connect to the external devices and/or networks.

SUMMARY

In one embodiment, the present disclosure describes a method, computer readable medium and apparatus for obtaining cellular network load information. For example, the method receives the cellular network load information, where the cellular network load information is encrypted. The method then decrypts the cellular network load information using a decryption key and performs a task responsive to the network load information that is decrypted.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly describes a method, computer readable medium and apparatus for obtaining cellular network load information. Many endpoint devices are capable of communicating via multiple modalities, such as cellular and non-cellular network access technologies, e.g., Wi-Fi. However, at any given time and at any given location, it may not be apparent which is the most efficient, most cost effective, or generally, which is the best method for a smart phone to connect to the external devices and/or networks. In addition, in certain embodiments a cellular network operator may desire to implement policies that will differentiate between groups of subscribers with respect to offloading usage to Wi-Fi networks, e.g., due to spikes in network load, failure of network elements and/or due to excess usage in certain portions of the network. Accordingly, a cellular network operator may provision various policies to endpoint devices with respect to network selection (e.g., choosing between cellular and Wi-Fi sessions). In addition, the cellular network operator may periodically broadcast information regarding network load to endpoint device in order to instruct or to allow the endpoint devices to select a radio access technology and a frequency carrier. However, the network operator may also seek to share such information with only certain categories of devices and to prevent competing networks from easily obtaining proprietary information regarding network load.

To address these issues and others, embodiments of the present disclosure may perform various operations, including but not limited to, obtaining subscriber information, selecting and providing a decryption key to an endpoint device of the subscriber based upon a category of the subscriber, and transmitting network load information that is encrypted such that the network load information can only be deciphered with an appropriate decryption key. In one embodiment, different encryption/decryption keys are used to reflect different classes of users, subscriptions and/or devices. In one embodiment, different policies may be enforced at different instances, even with the same load information. In yet another embodiment, encryption keys expire and must be renewed in order to prevent theft of the encryption key. These and other exemplary embodiments of the present disclosure are described in greater detail below in connection with the following FIGS. 1-6.

Figure 1:
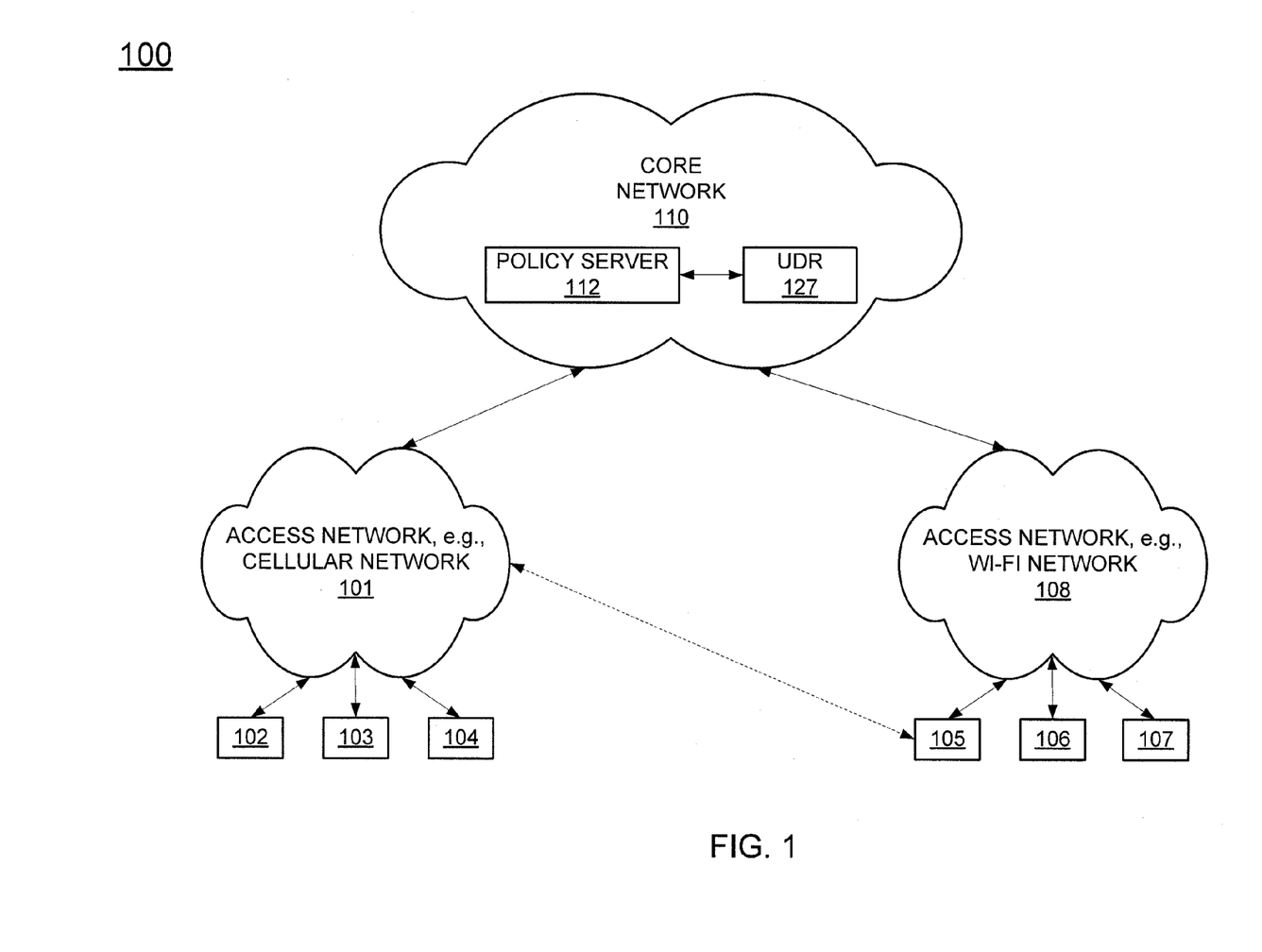
FIG. 1 illustrates an exemplary network related to the present disclosure.

To better understand the present disclosure, FIG. 1 illustrates an example network 100 related to the present disclosure. In one embodiment, the network 100 may also comprise a plurality of endpoint devices 102-104 configured for communication with core network 110 (e.g., an IP-based core backbone network supported by a service provider) via an access network 101. Similarly, a plurality of endpoint devices 105-107 are configured for communication with core network 110 via an access network 108.

The endpoint devices 102-107 may comprise customer endpoint devices such as personal computers, laptop computers, Personal Digital Assistants (PDAs), mobile/cellular phones, smart phones, tablets, and so forth. The access networks 101 and 108 serve to establish a connection between the endpoint devices 102-107 and core network 110. The access networks 101 and 108 may be either directly connected to core network 110, or indirectly through another network. In one illustrative embodiment, access network 101 comprises a cellular access network and access network 108 comprises a Wi-Fi network (broadly, a non-cellular access network).

In one embodiment, core network 110 includes a User Data Repository (UDR) 127, which refers to a network element that acts as a central repository of all customer specific authorizations, service profiles, preferences, etc. For example, the UDR 127 may store a category of a user/subscriber, such as "platinum", "gold", "silver", "bronze", or another scheme for categorizing a user. The category of the user may be used to distinguish a level of service to be provided to device(s) of the user, or to differentiate which services and features should be provided or offered to a user. In one embodiment of the present disclosure, the category of the user is used to determine a decryption key that should be provided to a user for receiving and decrypting cellular network load information broadcasts. In other words, the network operator may use different encryption/decryption keys to reflect different classes of users, subscriptions and/or devices.

In one embodiment, core network 110 also includes a policy server 112, which may comprise any hardware server or computer that is well known in the art. In one particular embodiment, policy server 112 may comprise an Access Network Discovery and Selection Function (ANDSF) server. For example, a typical ANDSF process may comprise the provisioning of policies from a cellular network operator to an endpoint device of a subscriber. The policies, or rules, may assist or direct the endpoint device as to how to discover non-cellular access networks. The ANDSF process may also convey rules, guidelines and directives as to when and whether to access such non-cellular networks, when to reconnect to the cellular network, and so forth. For example, an ANDSF server may provide a Wi-Fi offload policy to the endpoint device that describes when the endpoint device can, must or should switch between cellular and Wi-Fi usage.

Notably, in one embodiment of the present disclosure, the ANDSF process specifically includes the providing of a decryption key by the ANDSF server to an endpoint device. In one embodiment, the decryption key is for receiving encrypted network load information from the network. Thus, in one embodiment a method for providing a decryption key for cellular network load information is implemented in policy server 112. In addition, in one embodiment, the rules/policies/guidelines conveyed by the ANDSF process may also indicate parameters as to how an endpoint device is permitted or required to respond when presented with network load information. For example, in one embodiment the policy server 112 may obtain subscriber information from UDR 127 that indicates a category of the user/subscriber. For example, policy server 112 and UDR 127 may communicate with each other. Accordingly, in one embodiment the policy server 112 determines a decryption key, as well as a set of policies (e.g., a Wi-Fi offload policy) to provide to an endpoint device of the user based upon the category of the user. These functions are described in greater detail below in connection with the exemplary method 500.

The above network 100 is only described to provide an illustrative environment for implementing embodiments of the present disclosure. Thus, the present disclosure may also include any other different network configurations that are suitable for implementing embodiments as described herein, for effecting communications between the endpoint devices and the network (e.g., core network and access network components), and so forth. Thus, it should be realized that the communication system 100 may be expanded by including additional endpoint devices, access networks, network elements, application servers, etc., or modifying or substituting those illustrated in FIG. 1, without altering the scope of the present disclosure.

Figure 2:
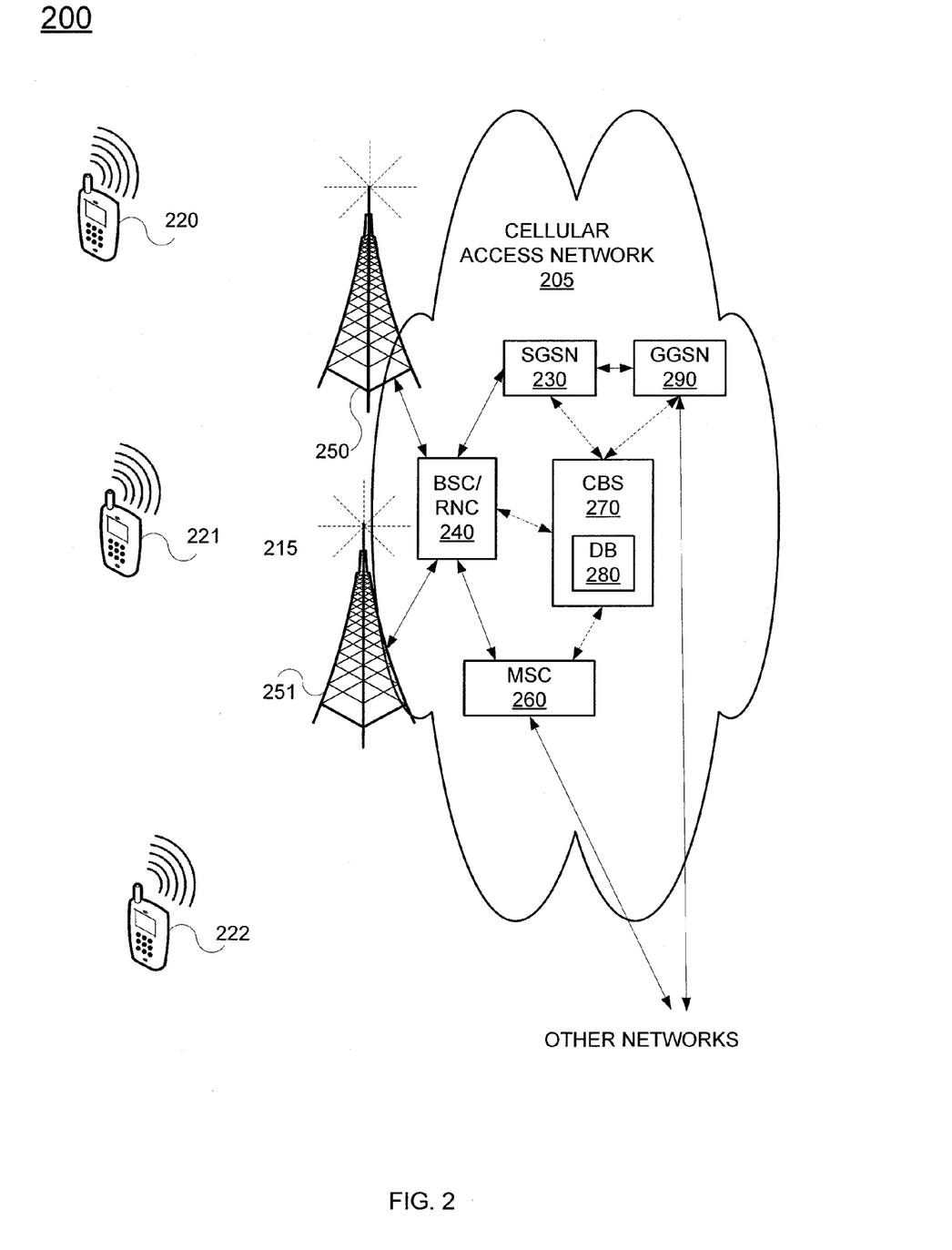
FIG. 2 illustrates an exemplary wireless access network related to the present disclosure.

FIG. 2 illustrates an exemplary access network 200 suitable for implementing embodiments of the present disclosure for receiving cellular network load information, for determining and transmitting cellular network load information, and/or for encryption and decryption of cellular network load information. In one embodiment, the access network 200 comprises a cellular access network 205. Access network 101 depicted in FIG. 1 may comprise, for example, a cellular access network 205 as shown in FIG. 2. Cellular access network 205 is configured to support wireless communication of users via respective wireless endpoint devices 220-222, with other wireless or wireline users, e.g., other endpoint devices, servers, cellular network components, core network components, and so forth. The link between wireless endpoint devices 220-222 and the wireless access network 205 comprises radio frequency (RF) signals between the one or more base stations 250-251 and the wireless endpoint devices 220-222. Here only two base stations 250 and 251 are depicted. However, it should be appreciated that the cellular access network 205 may comprise any number of base stations depending upon the size and needs of the cellular access network. In addition, although only three wireless endpoint devices 220-222 are depicted, it should be appreciated that any number of wireless endpoint devices may be serviced at the same time by the cellular access network 205.

Each of the base stations 250-251 comprises, at a minimum, a RF transceiver, and is configured to receive and transmit RF signals to and from wireless endpoint devices 220-222. As illustrated in FIG. 2, base stations 250-251 may support calls for a plurality of wireless endpoint devices 220-222 in a particular cell or cell sector of the base station. To manage the communications of the multiple wireless endpoint devices serviced by the cellular access network 205, the cellular access network 205 may comprise one or more network elements. For example, the cellular access network 205 may comprise one or more base station controllers (BSCs) and/or Radio Network Controllers (RNCs) 240 for managing RF communication of the base stations 250-251. BSC/RNC 240 performs a variety of wireless network management related tasks such as wireless channel assignments, determining transmission power levels, and controlling handovers from one base station to another base station, and the like. In one embodiment, cellular access network 205 includes at least one mobile switching center (MSC) 260. Among other functions, the MSC 260 may maintain user profile records for users currently serviced by the base stations within the portion of the cellular access network that is the responsibility of MSC 260. For example, the MSC provides the information that is needed to support mobile service subscribers, such as user registration and authentication information. The MSC may also function as a media gateway and/or media gateway controller facilitating communication between the cellular access network 205 and other networks.

In one embodiment, the cellular access network 205 also includes a serving general packet radio service (GPRS) support node (SGSN) 230, and a gateway GPRS support node (GGSN) 290. A serving GPRS support node (SGSN) refers to a network node responsible for communicating with user endpoint devices and routing of data calls. For example, a SGSN may send and receive data packets to and from user endpoint devices in the coverage area of the SGSN. A GGSN refers to a network node responsible for the interworking between a GPRS network (e.g., components of cellular access network 205 that support GPRS services and functionality) and external packet switched networks, e.g., the internet or other networks. For example, GGSN 290 convert GPRS data packets coming from SGSN 230 into the packet data protocol (PDP) format of an external packet network.

In one embodiment, the cellular access network 205 may also include a cellular broadcast server (CBS) 270. For example, CBS 270 may comprise any server or computer that is well known in the art, and the database 280 may be any type of electronic collection of data that is also well known in the art. In one embodiment, database 280 may comprise a network load database repository that is suitable for collecting and storing information relating to cellular network load. For example, database 280 may obtain network load information from various components of the cellular network 205, such as BSC 240, MSC 360, BS 250, BS 251, SGSN 230, GGSN 290, and so forth, as well as components within other networks (e.g., a core IP network). Accordingly, CBS 270 may obtain network load information from DB 280. Although DB 280 is shown in FIG. 2 as a component of CBS 270, in a different embodiment, DB 280 may comprise a stand-alone network component, or may reside in a different component of the cellular access network 205. Load information may pertain to one or more network elements, as well as the connections between such network elements, and may comprise, for example: a number of current voice or data calls (e.g., being handled by the one or more network elements), a remaining transport capacity (e.g., of a network element, an air interface, a trunk or fiber between network elements, etc.), a volume of bandwidth or network/radio resources used for user traffic and for control traffic, a remaining available bandwidth/network and/or radio resources, a number of additional subscribers that can be supported, a percentage of voice call capacity that is in use and an overall voice call capacity, a percentage of available bandwidth that is in use, a total available bandwidth, and so forth.

Thus, in one embodiment CBS 270 collects and aggregates data that is indicative of the load in the cellular network. Accordingly, CBS 270 may determine a score, value or other indicator of relative network load for broadcasting to endpoint devices via any one or more of base stations 250 and 251. It should be noted that in one embodiment, DB 280 may perform such functions instead of, or in conjunction with CBS 270. Notably, load information broadcasts may be received by any and all endpoint devices in communication with such base stations (e.g., endpoints 220-222). In one embodiment, CBS 270 may encrypt each broadcast such that the network load information contained in the broadcast is only intelligible to endpoint devices possessing a proper decryption key. Advantageously, this allows a network operator to restrict the deciphering of broadcasted network load information to only authorized devices. In other words, devices of subscribers of other cellular network operators will not be able to understand the contents of the broadcast. Similarly, subscribers of the cellular network who do not have the proper decryption key will also not be able to understand the contents of the broadcast. Thus, the utility of the network load information may be restricted to only devices of those users who are in a certain category (e.g., the "bronze" category).

Figure 4:
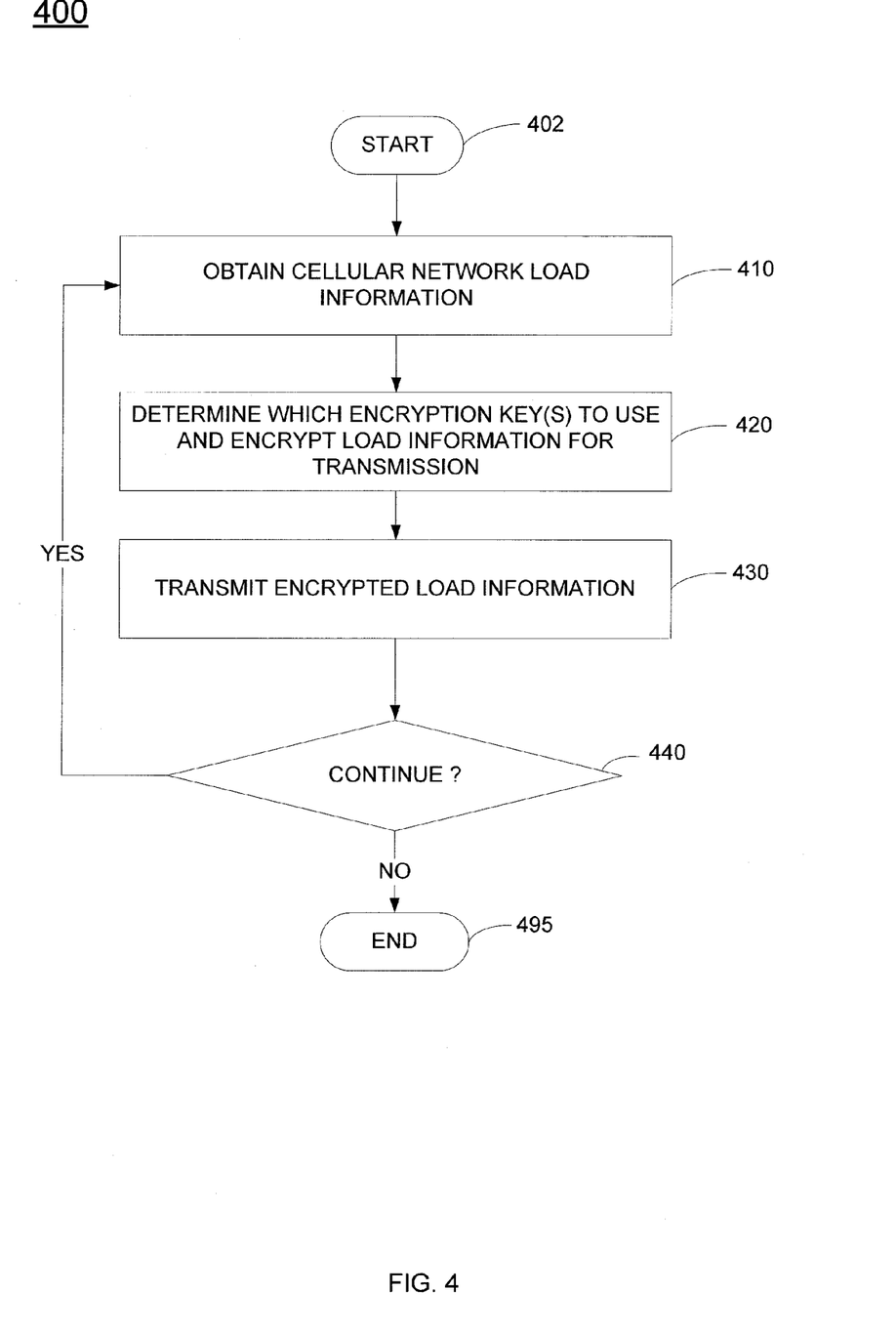
FIG. 4 illustrates a flowchart of a method for determining and transmitting cellular network load information according to embodiments of the present disclosure.

In one embodiment, CBS 270 determines a network load for each cell. For instance, CBS 270 may determine a network load for the cell associated with base station 250 and a different network load for the cell associated with base station 251. Thereafter, CBS 270 may broadcast a first network load score via base station 250 and a second network load score via base station 251, respectively. These exemplary functions are described in greater detail below in connection with the method 400.

Although the network elements deployed within the cellular access network 205 have been described as one or more discrete devices, it should be appreciated that the functionality described with respect to each network element is not limited to the particular device as described and depicted herein. Rather, the embodiment of FIG. 2 is merely illustrative of one cellular access network configuration that is suitable for implementing embodiments of the present invention. Thus, any other network elements providing the same functionality described herein with respect to the cellular access network 205 would be equally suitable for use in accordance with embodiments of the present invention. In addition, one or more components depicted in cellular access network 205 may actually reside in a different network or may have connections to other components via one or more other network elements that are not shown. Thus, those skilled in the art will realize that the cellular access network 205 may be expanded by including or substituting additional endpoint devices, base stations, BSCs, MSCs, SGSNs, GGSNs, network elements, application servers, etc. without altering the scope of the present disclosure. For example, base stations 250 and 251 may comprise a base transceiver station (BTS) in a GSM—$2^{nd}$ generation (2G) network or may comprise a "Node B" or "eNodeB" in a Universal Mobile Telecommunications System (UMTS)—$3^{rd}$ generation (3G) network or Long Term Evolution (LTE) network.

Figure 3:
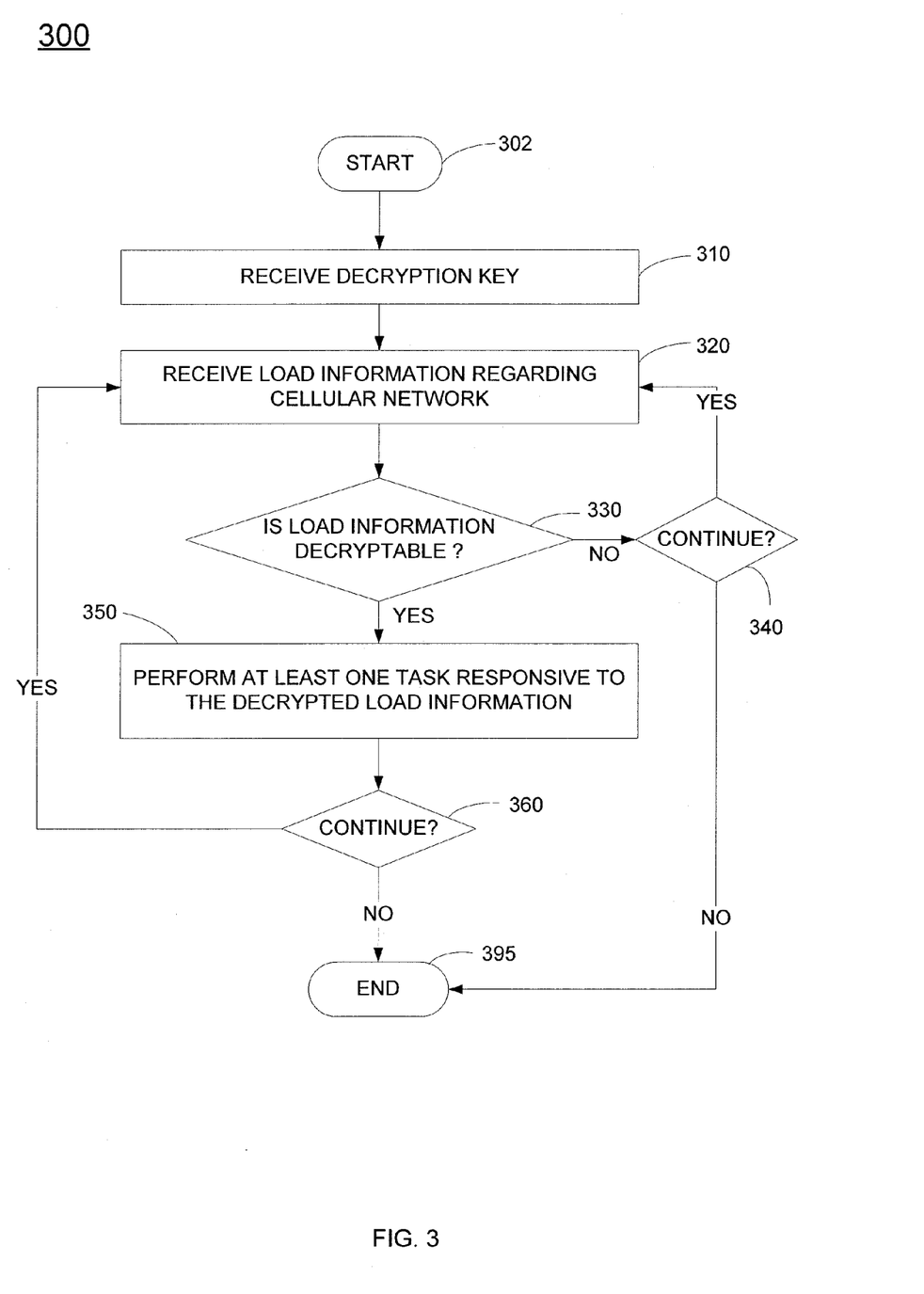
FIG. 3 illustrates a flowchart of a method for obtaining cellular network load information, according to the present disclosure.

FIG. 3 illustrates a flowchart of a method 300 for receiving cellular network load information. In one embodiment, the method 300 is performed by any one or more endpoint devices in FIG. 1 and/or in FIG. 2. For example, the method 300 may be performed by any one of the endpoint devices 220-222 in FIG. 2 or endpoint devices 102-107 in FIG. 1. Alternatively, or in addition, the method 300 may be performed by a general purpose computer (e.g., computer 600 in FIG. 6) programmed to perform the functions, steps and/or operations of the method.

Method 300 starts in step 302 and proceeds to step 310. In step 310, method 300 receives a decryption key. For example, a decryption key may be received via a wireless communication through a cellular base station of a cellular network. In one embodiment, the decryption key is sent from an access network discovery and selection function (ANDSF) server as part of an ANDSF communication. In one embodiment, the decryption key is to be used in conjunction with receiving encrypted network load information from the cellular network.

At step 320, the method 300 receives load information regarding the cellular network. For example, a cellular broadcast server (e.g., CBS 270 in FIG. 2) may periodically transmit local load information to endpoint devices serviced by a particular cell, a particular cellular access network, or other segment or region of an integrated cellular network (e.g., a UMTS Terrestrial Radio Access Network (UTRAN) component of a UMTS network). Load information may comprise an indication as to the relative load level at the base station or other region of the cellular network. Various factors may be taken into account in determining the load information. The load information (e.g., for a cellular base station, sector, UTRAN, etc.) may comprise: a number of current voice calls, a remaining voice call capacity, a volume of bandwidth used, a remaining available bandwidth, a number of additional subscriber that can be supported, a percentage of voice call capacity that is in use and an overall voice call capacity a percentage of available bandwidth that is in use and a total available bandwidth, and so forth.

Alternatively or in addition, load information that is received may comprise a summary of the detailed load information such as listed above. For instance, load information received at step 320 may simply comprise an indicator of relative load status such as "low", "medium" and "high" or "excellent", "good", "fair", "poor" and "unavailable". Similarly, the load information that is received at step 320 may follow a numerical scale, e.g., 1 to 10, or any other scale to indicate the relative load in the region of the cellular network. In one embodiment, the load information that is received at step 320 is encrypted. Thus, as described in further detail below, only endpoint devices with the corresponding decryption key may be able to properly interpret the load information that is received.

At step 330, the method 300 determines whether the load information that is received at step 320 is decryptable. For example, the method 300 may, at step 310, have received a decryption key, e.g., as part of an ANDSF process. Accordingly, at step 330 the decryption key may be applied to the load information that is received. If the decryption key successfully decrypts the load information received at step 320, then the endpoint device is authorized to possess the load information. Notably, by providing a decryption key only to selected endpoint devices, a cellular network operator may thus limit eligibility to interpret the load information to only those endpoint devices which it chooses to authorize. For instance, subscribers of other cellular network operators will not be able to decrypt and interpret the load information. In addition, subscribers holding expired decryption keys (e.g., time dependent decryption keys) will no longer be able to properly interpret load information broadcasts that are received unless they continue to receive current and up to date decryption keys. For example, decryption keys may be set to expire within one week, one month or any other predefined time period. In one embodiment, a new or current decryption key is provided to an endpoint device each time an ANDSF process is invoked with respect to the endpoint device (e.g., once every several weeks).

Similarly, the cellular network operator may choose to differentiate between and among subscribers of its network. For example, the cellular network operator may place subscribers into several categories, such as "platinum", "gold", "silver", "bronze", etc. Accordingly, subscribers in different categories may be given different decryption keys for receiving the cellular network load information. For instance, as part of an ANDSF process, an ANDSF server may receive subscriber information from a user data repository (UDR). In one embodiment, the subscriber information indicates the category of the subscriber and/or one or more devices of the subscriber. Thus, when an ANDSF process is invoked with respect to a device of the user, the ANDSF server may select a decryption key corresponding to the relevant category to transmit to the endpoint device of the subscriber.

If, at step 330, the load information is not decryptable, the method 300 proceeds to step 340. At step 340, the method 300 determines whether to continue. If yes, the method proceeds back to step 320 to continue to receive load information. If no, the method proceeds to step 395 where the method ends. If, however, the load information is decryptable at step 330, the method 300 then proceeds to step 350.

At step 350, the method 300 performs at least one task responsive to the decrypted load information. For example, step 350 may comprise automatically switching the endpoint device from cellular network usage to a non-cellular network usage, if available. For example, the method may implement cellular network operator policies on the endpoint device that direct the method to automatically (i.e., without user input) implement one or more action responsive to receiving particular load information. For example, certain load information may be targeted to offloading only "bronze" category users/endpoint devices from the cellular network Wi-Fi networks. Thus, if the method receives and decrypts such load information at a "bronze" category endpoint device, at step 350 the method may automatically switch the endpoint device to Wi-Fi usage, whereas if the method receives and decrypts such information at a "platinum" category device, the policy rules may allow the endpoint device of the "platinum" category to choose which type of network connection to use. Thus, different policies may be enforced at different instances, even with the same network load information, e.g., depending upon the category of the endpoint device.

It should also be noted that in one embodiment, step 350 may comprise switching the endpoint device from a non-cellular network usage back to Wi-Fi usage. For example, the endpoint device may be currently using a Wi-Fi connection because previous load information from the cellular network indicated that the cellular network was congested. However, the method 300 may continue to receive and/or monitor certain communications from the cellular network such that the method may receive cellular network load information at step 320. Accordingly, the current cellular network load information may indicate that the cellular network is no longer congested. Thus, at step 350, the method 300 may switch the endpoint device back to a cellular network connection. For example, endpoint device 105 of FIG. 1 may be using a Wi-Fi access network (e.g., access network 108), but will be switched back to a cellular access network (e.g., access network 101) as the network load condition of the cellular access network improves. Thus, FIG. 1 illustrates that endpoint device 105 may alternatively have connections to both access network 101 and access network 108.

Following step 350, the method 300 proceeds to step 360 where the method determines whether to continue. If yes, the method proceeds back to step 320 to continue to receive load information. If no, the method proceeds to step 395 where the method ends.

FIG. 4 illustrates a flowchart of a method 400 for determining and transmitting cellular network load information. In one embodiment, the method 400 is performed by any one or more devices in Core Network 110 in FIG. 1 and/or Cellular Access Network 205 in FIG. 2. For example, the method 400 may be performed by Cellular Broadcast Server 270 in FIG. 2. Alternatively, or in addition, the method 400 may be performed by a general purpose computer (e.g., computer 600 in FIG. 6) programmed to perform the functions, steps and/or operations of the method.

Method 400 starts in step 402 and proceeds to step 410. In step 410, method 400 obtains cellular network load information. For example, the method 400 may obtain information regarding various parameters of one or more base stations or other network elements. Accordingly, at step 410, the method may determine load information for each sector, each base station, or other region of a cellular network (e.g., the coverage area of all or a portion of the base stations serviced by a base station controller).

At step 420, the method 400 determines which encryption key(s) to use and encrypts the load information for transmission. For instance, the method may determine that only endpoint devices of "platinum" and "gold" subscribers should be able to receive the current load information. As such, at step 420 the method may encrypt the load information such that it is decryptable only with the encryption keys held by the "platinum" and "gold" subscribers. For example, the cellular network may have an intermediate load level. In addition, the network operator policy may provide that "bronze" category devices should be offloaded to Wi-Fi networks, if available. Thus, the broadcast may be encrypted for deciphering only by "bronze" category devices, whereas devices in other categories should not be bothered with such information.

At step 430, the method 400 transmits the encrypted load information. For example, the method may forward the encrypted load information created at step 420 to one or more base stations for broadcast to endpoint devices in the vicinity of the one or more base stations.

Following step 430, the method proceeds to step 440 where the method determines whether to continue. If yes, the method proceeds back to step 410 to continue to obtain load information. If no, the method proceeds to step 495 where the method ends.

Figure 5:
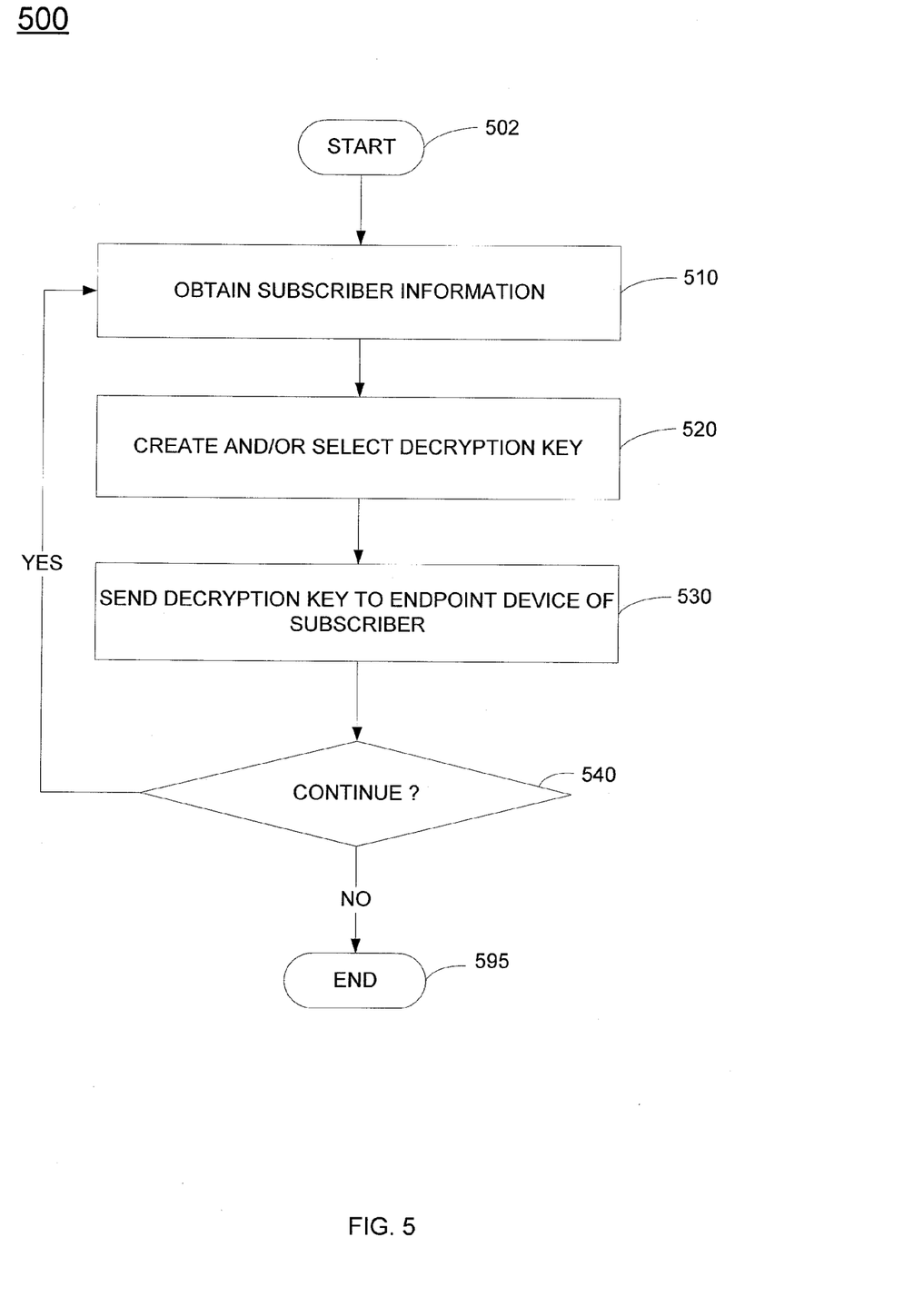
FIG. 5 illustrates a flowchart of a method for providing a decryption key for cellular network load information according to embodiments of the present disclosure.

FIG. 5 illustrates a flowchart of a method 500 for providing a decryption key for cellular network load information. In one embodiment, the method 500 is performed by any one or more devices in Core Network 110 in FIG. 1 and/or Cellular Access Network 205 in FIG. 2. For example, the method 500 may be performed by Policy Server 112 in FIG. 1 (e.g., an Access Network Discovery Selection Function (ANDSF) Server). Alternatively, or in addition, the method 500 may be performed by a general purpose computer (e.g., computer 600 in FIG. 6) programmed to perform the functions, steps and/or operations of the method.

Method 500 starts in step 502 and proceeds to step 510. In step 510, method 500 obtains subscriber information. For instance, the method may obtain subscriber information from a user data repository (UDR). In one embodiment, the subscriber information indicates the category of the subscriber and/or one or more endpoint devices of the subscriber. For example, the cellular network operator may place subscribers into several categories, such as "platinum", "gold", "silver", "bronze", etc.

At step 520, the method 500 creates and/or selects a decryption key for an endpoint device of the subscriber. For instance, the method may store a different decryption key for each user category. Thus, in one embodiment, the method selects the appropriate key corresponding to the category of the subscriber and/or endpoint device of the subscriber.

At step 530, the method 500 sends the decryption key to the endpoint device. For instance, the method may send the decryption key as part of an ANDSF process. For example, local cellular network information, network updates, network operator policy information, including policy information related to network load, and the like, as well as a decryption key for decrypting network load information, may be transmitted to the endpoint device as part of the ANDSF process.

Following step 530, the method proceeds to step 540 where the method determines whether to continue. If yes, the method proceeds back to step 510 to continue to obtain subscriber information. For example, the steps, functions and/or operations of the method 500 may be repeated with respect to a different subscriber/endpoint device or may be repeated with respect to the same subscriber or subscriber device at a later time. In one embodiment, decryption keys are time dependent. Thus, an encryption key may be set to expire within one week, one month or other time period. Accordingly, a new or current decryption key may be provided to an endpoint device each time an ANDSF process is invoked with respect to the endpoint device. If no, the method proceeds to step 595 where the method ends.

In addition, although not specifically specified, one or more steps, functions or operations of the respective methods 300, 400 and 500 may include a storing, displaying and/or outputting step as required for a particular application. In other words, any data, records, fields, and/or intermediate results discussed in the method can be stored, displayed and/or outputted either on the device executing the method or to another device, as required for a particular application.

Furthermore, steps, blocks, functions or operations in FIGS. 3-5 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the example embodiments of the present disclosure.

Figure 6:
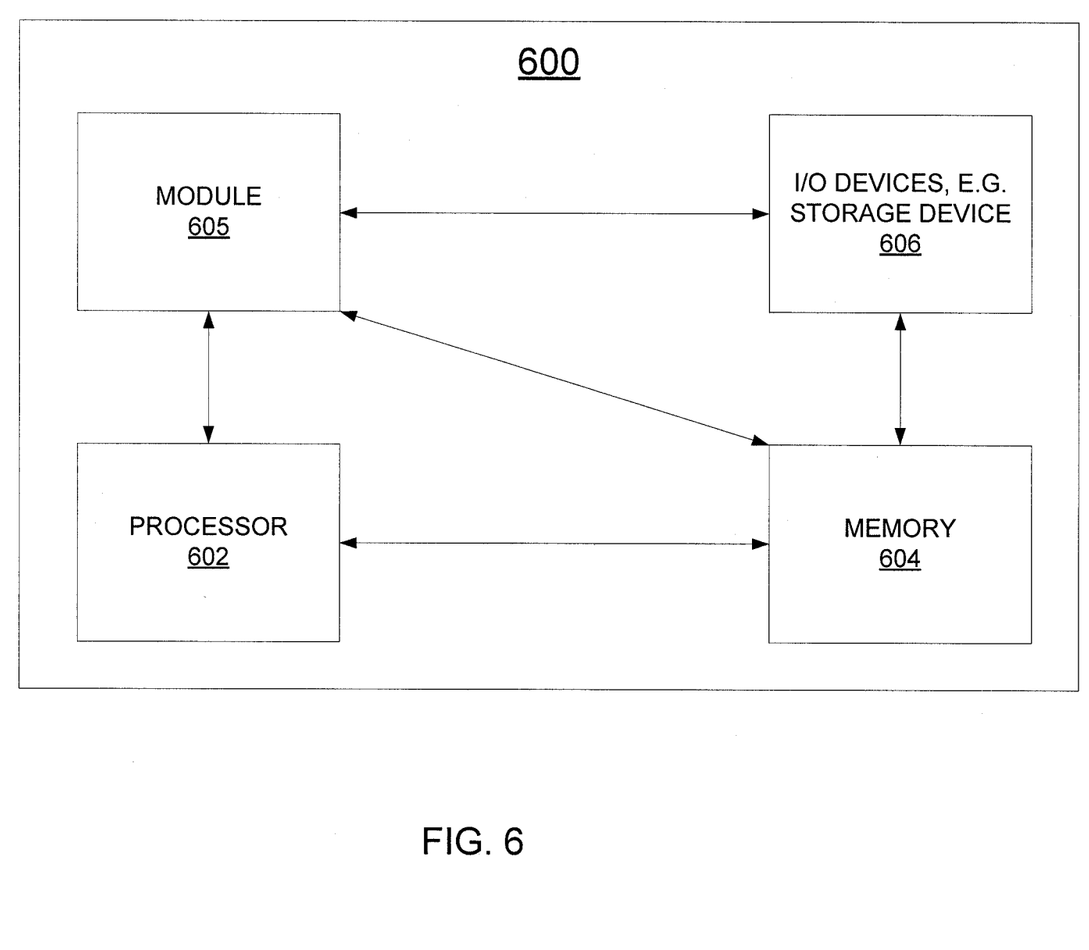
FIG. 6 illustrates a high-level block diagram of a general-purpose computer suitable for use in performing the functions, methods and algorithms described herein.

FIG. 6 depicts a high level block diagram of a general purpose computer suitable for use in performing the functions described herein. For examples, any one or more components or devices illustrated in FIGS. 1 and 2, or described in connection with the methods 300, 400 and 500 may be implemented as the system 600. As depicted in FIG. 6, the system 600 comprises a hardware processor element 602 (e.g., a microprocessor, a central processing unit (CPU) and the like), a memory 604, e.g., random access memory (RAM) and/or read only memory (ROM), a module 605, and various input/output devices 606 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)). In one embodiment, the module 605 is for obtaining cellular network load information, e.g., according to the method 300 above. In one embodiment, the module 605 is for determining and transmitting cellular network load information, e.g., according to the method 400 above. In still another embodiment, the module 605 is for providing a decryption key for cellular network load information, e.g., according to the method 500 above.

It should be noted that embodiments of the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure and/or to cause a hardware processor to perform the steps, functions and/or operations of the above disclosed method. It should be noted that a hardware processor so configured may perform all or a portion of the operations itself, or may instruct or direct another element to perform the operations (e.g., one or more of input/output devices 606, another processor, and so forth). In one embodiment, the present module or process 605 can be implemented as computer-executable instructions (e.g., a software program comprising computer-executable instructions) and loaded into memory 604 and executed by hardware processor 602 to implement the functions as discussed above in connection with the exemplary methods 300, 400 and/or 500 respectively. As such, the present module or process 605 as discussed above in methods 300, 400 or 500 respectively (including associated data structures) can be stored on a non-transitory (e.g., tangible or physical) computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for obtaining cellular network load information, the method comprising:
receiving, by a processor of a cellular endpoint device from a policy server of a cellular network, a decryption key for decrypting the cellular network load information and a policy of the cellular network that indicates how the cellular endpoint device is permitted to respond to the cellular network load information, wherein said cellular endpoint device is a phone;

receiving, by the processor, the cellular network load information, wherein the cellular network load information comprises a remaining available capacity of a portion of the cellular network, wherein the cellular network load information is received via a broadcast message from the cellular network, wherein the cellular network load information is encrypted, wherein the policy is received prior to the receiving the cellular network load information;

decrypting, by the processor, the cellular network load information the decryption key that was received from the policy server; and performing, by the processor, a task responsive to the cellular network load information that is decrypted, wherein the task is performed based on the policy of the cellular network that indicates how the cellular endpoint device is permitted to respond to the cellular network load information, wherein the task comprises switching the cellular endpoint device between a usage of the cellular network and a usage of a non-cellular network.

2. The method of claim 1, wherein the decryption key is specific to a category of subscribers.

3. The method of claim 1, wherein the decryption key is specific to a category of device types.

4. The method of claim 1, wherein the decryption key is time dependent.

5. The method of claim 1, wherein the switching comprises:
switching the cellular endpoint device from the usage of the cellular network to the usage of the non-cellular network.

6. The method of claim 1, wherein the switching comprises:
switching the cellular endpoint device from the usage of the non-cellular network to the usage of the cellular network.

7. A non-transitory computer-readable medium storing a plurality of instructions which, when executed by a processor of a cellular endpoint device, cause the processor to perform operations for obtaining cellular network load information, the operations comprising:

receiving, from a policy server of a cellular network, a decryption key for decrypting the cellular network load information and a policy of the cellular network that indicates how the cellular endpoint device is permitted to respond to the cellular network load information, wherein said cellular endpoint device is a phone;

receiving the cellular network load information, wherein the cellular network load information comprises a remaining available capacity of a portion of the cellular network, wherein the cellular network load information is received via a broadcast message from the cellular network, wherein the cellular network load information is encrypted, wherein the policy is received prior to the receiving the cellular network load information;

decrypting the cellular network load information using the decryption key that was received from the policy server; and performing a task responsive to the cellular network load information that is decrypted, wherein the task is performed based on the policy of the cellular network that indicates how the cellular endpoint device is permitted to respond to the cellular network load information, wherein the task comprises switching the cellular endpoint device between a usage of the cellular network and a usage of a non-cellular network.

8. The non-transitory computer-readable medium of claim 7, wherein the switching comprises:
switching the cellular endpoint device from the usage of the cellular network to the usage of the non-cellular network.

9. The non-transitory computer-readable medium of claim 7, wherein the switching comprises:
switching the cellular endpoint device from the usage of the non-cellular network to the usage of the cellular network.

10. A cellular endpoint device for obtaining cellular network load information, comprising:
a processor; and
a computer-readable medium storing a plurality of instructions which, when executed by the processor, cause the processor to perform operations, the operations comprising:

receiving, from a policy server of a cellular network, a decryption key for decrypting the cellular network load information and a policy of the cellular network that indicates how the cellular endpoint device is permitted to respond to the cellular network load information, wherein said cellular endpoint device is a phone;

receiving the cellular network load information, wherein the cellular network load information comprises a remaining available capacity of a portion of the cellular network, wherein the cellular network load information is received via a broadcast message from the cellular network, wherein the cellular network load information is encrypted, wherein the policy is received prior to the receiving the cellular network load information;

decrypting the cellular network load information using the decryption key that was received from the policy server; and performing a task responsive to the cellular network load information that is decrypted, wherein the task is performed based on the policy of the cellular network that indicates how the cellular endpoint device is permitted to respond to the cellular network load information, wherein the task comprises switching the cellular endpoint device between a usage of the cellular network and a usage of a non-cellular network.

* * * * *